United States Patent
Saito

(10) Patent No.: US 7,802,744 B2
(45) Date of Patent: Sep. 28, 2010

(54) SPINNING REEL

(75) Inventor: Kei Saito, Sakai (JP)

(73) Assignee: Shimano Inc., Osaka (JP)

( * ) Notice: Subject to any disclaimer, the term of this patent is extended or adjusted under 35 U.S.C. 154(b) by 30 days.

(21) Appl. No.: 12/204,770

(22) Filed: Sep. 4, 2008

(65) Prior Publication Data

US 2009/0072066 A1    Mar. 19, 2009

(30) Foreign Application Priority Data

Sep. 14, 2007 (JP) .............................. 2007-239752
Sep. 14, 2007 (JP) .............................. 2007-239753

(51) Int. Cl.
*A01K 89/00* (2006.01)
(52) U.S. Cl. ..................... 242/241; 242/311
(58) Field of Classification Search ................. 242/241, 242/242, 311, 282
See application file for complete search history.

(56) References Cited

U.S. PATENT DOCUMENTS

| | | | | |
|---|---|---|---|---|
| 4,369,930 A * | 1/1983 | Noda | ......................... | 242/282 |
| 4,491,285 A * | 1/1985 | Councilman | ............... | 242/242 |
| 4,512,531 A | 4/1985 | Tunoda | | |
| 5,350,130 A * | 9/1994 | Hitomi et al. | ............... | 242/241 |
| 5,564,639 A * | 10/1996 | Yamaguchi | ................ | 242/241 |
| 5,575,431 A * | 11/1996 | Henriksson | ................. | 242/241 |
| 5,934,586 A * | 8/1999 | Kang et al. | .................. | 242/241 |
| 5,984,220 A * | 11/1999 | Kawabe | ...................... | 242/241 |
| 6,412,721 B2 * | 7/2002 | Kawabe et al. | .............. | 242/278 |
| 6,581,863 B1 * | 6/2003 | Lu | ............................. | 242/242 |
| 6,655,619 B2 * | 12/2003 | Kitajima | ..................... | 242/241 |
| 7,293,731 B2 * | 11/2007 | Kitajima et al. | ............. | 242/241 |
| 2002/0134873 A1 * | 9/2002 | Kawabe et al. | .............. | 242/241 |
| 2007/0057105 A1 * | 3/2007 | Kitajima et al. | ............. | 242/241 |

FOREIGN PATENT DOCUMENTS

| | | |
|---|---|---|
| EP | 1293120 A1 | 3/2003 |
| EP | 1461999 A2 | 9/2004 |
| JP | H01-42461 Y | 12/1989 |

* cited by examiner

*Primary Examiner*—Evan H Langdon
(74) *Attorney, Agent, or Firm*—Global IP Counselors, LLP

(57) ABSTRACT

A worm shaft disposed on an upper side of a master gear shaft. A spool shaft disposed on an opposite lower side of the master gear shaft. An engaging member arranged to engage a spiral groove in worm shaft is also disposed on the upper side of the master gear shaft. A slider body includes a first mounting portion disposed on the opposite lower side of the master gear shaft and is a portion to which the spool shaft is fixed, a second mounting portion that is disposed on the upper side of the master gear shaft and is a portion to which the engaging member is engaged, and a coupling portion for coupling the first mounting portion and the second mounting portion so that the master gear shaft is straddled by the first mounting portion and the second mounting portion when the spool shaft is disposed most forward.

13 Claims, 9 Drawing Sheets

SPINNING REEL

CROSS-REFERENCE TO RELATED APPLICATIONS

This application claims priority under 35 U.S.C. §119 to Japanese Patent Application No. 2007-239752 filed on Sep. 14, 2007, and Japanese Patent Application No. 2007-239753 filed on Sep. 14, 2007. The entire disclosure of both Japanese Patent Application No. 2007-239752 and Japanese Patent Application No. 2007-239753 are hereby incorporated herein by reference.

BACKGROUND OF THE INVENTION

1. Field of the Invention

Aspects of the present invention generally relate to a spinning reel, and more specifically, to a spinning reel that is mounted to a fishing rod and is allowed to reel out the fishing line forward.

2. Background Information

In general, a spinning reel includes a reel unit that has a handle and is mounted to a fishing rod, a spool for winding a fishing line, which is mounted to the reel unit so as to be allowed to move back and forth, a rotor that is rotatably supported by the reel unit and serves to wind the fishing line around the spool, a rotor driving mechanism for rotating the rotor in conjunction with rotation of the handle, and an oscillation mechanism for moving the spool back and forth in conjunction with rotation of the handle. The rotor driving mechanism includes a master gear, which has a master gear shaft to which the handle is integrally and rotatably mounted and a gear part disposed on the outer peripheral side of the master gear shaft to transmit rotation of the handle to the rotor, and a pinion gear, which is integrally and rotatably mounted to the rotor and to which rotation of the master gear is transmitted in conjunction with rotation of the handle. The oscillation mechanism is a traverse cam typed reciprocation mechanism. The oscillation mechanism includes a worm shaft that has a spiral groove formed on its outer peripheral part and rotates in conjunction with rotation of the pinion gear, an engaging member that is engaged with the spiral groove of the worm shaft, and a slider to which the engaging member is mounted and which moves back and forth in conjunction with rotation of the worm shaft.

In a spinning reel of this type, when the handle is rotated in a line-winding direction, rotational force of the handle is transmitted to the pinion gear through the master gear, and the rotational force transmitted to the pinion gear is transmitted to the rotor through the front part of the pinion gear, and the rotor is rotated in the line-winding direction. On the other hand, when the worm shaft is rotated in conjunction with rotation of the pinion gear, the slider moves in the anteroposterior direction through the engaging member that is engaged with the spiral groove. When the slider is moved in the anteroposterior direction, the spool shaft, which is axially and non-movably mounted to the slider, is moved in the anteroposterior direction; and accordingly, the spool is moved in the anteroposterior direction.

An oscillation mechanism of this type is known in which the worm shaft is disposed on the upper side (fishing rod mounting side) of the spool shaft for forming the reel unit to have a small size (see Japanese Examined Utility Model Application Publication No. H01-42461).

Here, the worm shaft is disposed on the upper side of the spool shaft. Therefore, it is not necessary to produce a space for disposing a variety of mechanisms on the lower side of the spool shaft. Accordingly, it is possible to construct the reel body to have a small size in the vertical direction.

Also, in the oscillation mechanism of this type, the worm shaft is disposed on the upper side of the master gear shaft, and the engaging member to be engaged with the spiral groove of the worm shaft is also disposed rearward on the upper side of the master gear shaft. Therefore, a part of the slider to which the engaging member is mounted is disposed rearward on the upper side of the master gear shaft. On the other hand, a part of the slider to which the spool shaft is secured is disposed rearward on the lower side of the master gear shaft.

In addition, in the oscillation mechanism of this type, the worm shaft is arranged to anteroposteriorly penetrate the slider disposed on the upper side of the master gear shaft. The worm shaft is also arranged to anteroposteriorly penetrate the part of the slider to which the spool shaft is secured is disposed on the lower side of the part of the slider to which the worm shaft is mounted and at the same as this, on the lower side of the master gear shaft. Here, the worm shaft is configured to penetrate the upper side of the slider back and forth and plays a role of a guide shaft for guiding the slider in the anteroposterior direction.

SUMMARY OF THE INVENTION

It has been discovered that in the oscillation mechanism as discussed above, the slider is configured to be disposed above and below the rear part of the master gear shaft. Therefore, when the slider is moved most forward, the part of the slider to which the engaging member is mounted and the part of the slider to which the spool shaft is secured are supposed to be positioned behind the master gear shaft. Accordingly, to sufficiently keep the anteroposterior displacement of the slider, it is needed to extend rearward the worm shaft disposed behind the master gear shaft and the guide shaft for guiding the slider in the anteroposterior direction. However, if the worm shaft and the guide shaft are extended rearward, the anteroposterior size of the reel unit may be increased to accommodate the worm shaft and the guide shaft in the reel unit.

It has also been discovered that in the oscillation mechanism as discussed above, the worm shaft is configured to penetrate the upper side of the slide back and forth. Therefore, it will be necessary to thickly form the upper side of the slider to support the worm shaft, and thus, the slider usually formed to have a large size. When the slider is constructed to have a large size, particularly, when the slider is thickly formed in the horizontal direction, the horizontal size of the reel unit is increased to accommodate the slider in the reel unit.

Accordingly, aspects of the present invention have been created to provide a reel unit compactly in a spinning reel in the anteroposterior direction, and to provide a slider having a small size in a spinning reel, and to provide a reel unit compactly in a spinning reel in the horizontal direction.

According to one aspect of the present invention, a spinning reel is mounted to a fishing rod and is configured to reel out a fishing line forward. The spinning reel includes a reel unit that is mounted to the fishing rod and has a handle, a spool shaft that is mounted to the reel unit so as to be allowed to move along an anteroposterior direction, a spool that is fixed to a front end portion of the spool shaft and that the fishing line is wound around the outer periphery thereof, a rotor that is rotatably disposed on the outer peripheral side of the spool and is configured to wind the fishing line around the spool, a master gear that is rotatably supported by the reel unit and includes as master gear shaft to which the handle is integrally rotatably mounted and which is disposed on the fishing rod mounting side of the spool shaft, and a gear part that is disposed on the outer peripheral side of the master gear shaft and is configured to transmit rotation of the handle to the rotor, a pinion gear that is disposed on the outer peripheral side of the spool shaft and is mounted integrally rotatably mounted to the rotor, and to which rotation of the master gear is transmitted in conjunction with rotation of the handle, and an oscillation mechanism that is configured to move the spool back and forth through the spool shaft in conjunction with rotation of the pinion gear. The oscillation mechanism includes a worm shaft that a spiral groove is formed on the outer peripheral part thereof, which is disposed on the fishing rod mounting side of the master gear shaft approximately in parallel to the spool shaft, and which is configured to rotate in conjunction with rotation of the pinion gear, and a slider that has an engaging member, which is engaged with the spiral groove of the worm shaft, and a slider body to which the engaging member is mounted and which is configured to move back and forth in conjunction with rotation of the worm shaft. The slider body includes a first mounting portion to which the rear end portion of the spool shaft is at least relatively non-rotatably mounted in an axial direction, a second mounting portion to which the engaging member is mounted, and a coupling portion for coupling the first mounting portion and the second mounting portion so that the master gear shaft is straddled by the first mounting portion and the second mounting portion when the spool shaft is positioned most forward.

In the spinning reel, the worm shaft is disposed on the fishing rod mounting side (upper side) of the master gear shaft, and the spool shaft is disposed on the opposite side from the fishing rod mounting side (lower side) of the master gear shaft, and the engaging member that is engaged with the spiral groove of the worm shaft is also disposed on the fishing rod mounting side (upper side) of the master gear shaft. In addition, the slider body includes the first mounting portion that is disposed on the opposite side from the fishing rod mounting side (lower side) of the master gear shaft and is a portion to which the spool shaft is fixed, the second mounting portion that is disposed on the fishing rod mounting side (upper side) of the master gear shaft and is a portion to which the engaging member is mounted, and the coupling portion for coupling the first mounting portion and the second mounting portion so that the master gear shaft is straddled by the first mounting portion and the second mounting portion when the spool shaft is positioned most forward. Here, the first mounting portion and the second mounting portion are disposed to straddle above and below the master gear shaft when the spool shaft is positioned most forward. Therefore, it is possible to dispose the first mounting portion, that is, the portion to which the spool shaft is fixed, and the second mounting portion, that is, the portion to which the engaging member is mounted, to the forward of the master gear shaft. Therefore, it is possible to sufficiently keep the anteroposterior displacement of the slider without extending rearward the worm shaft and the guide shaft for guiding the slider body in the anteroposterior direction. Therefore, it is possible to shorten the rear part of the reel unit in the anteroposterior direction. Accordingly, it is possible to compactly form the reel unit in the anteroposterior direction.

According to another aspect of the present invention, a spinning reel wherein the portion of the master gear shaft straddled by the first mounting portion and the second mounting portion is formed to have a diameter less than that of the other portions of the master gear shaft. In this case, it is possible to compactly form the reel unit in the vertical direction while supporting force of the handle shaft portion mounting portions is enhanced, for example, by forming the handle shaft portion mounting portions on the both ends of the master gear shaft to have a large diameter and by forming the center part of the master gear shaft to have a small diameter.

According to another aspect of the present invention, a spinning reel wherein the portion of the master gear shaft straddled by the first mounting portion and the second mounting portion is a solid-core member. In this case, it is possible to reduce the diameter of the shaft while the strength of the master gear shaft is maintained, by forming the master gear shaft with a solid-core member. Therefore, it is possible to dispose the first mounting portion and the second mounting portion of the slider body to be adjacent to the master gear shaft, respectively. Accordingly, it is possible to compactly from the reel unit in the vertical direction.

According to another aspect of the present invention, a spinning reel wherein at least the second mounting portion of the first and second mounting portions is disposed to be positioned more forward than the master gear shaft when the spool shaft is positioned most forward. In this case, it is possible to at least dispose the worm shaft to the forward of the master gear shaft by at least disposing the second mounting portion, that is, a mounting part of the engaging member, more forward than the master gear shaft. Therefore, it is possible to compactly from the reel unit in the anteroposterior direction.

According to another aspect of the present invention, a spinning reel wherein the second mounting portion is disposed to be positioned more forward than the first mounting portion. In this case, it is possible to dispose the worm shaft to the frontward of the master gear shaft as much as possible by disposing the second mounting portion, that is, a portion to which the engaging member is mounted, more forward than the first mounting portion, that is, a portion to which the spool shaft is fixed.

According to another aspect of the present invention, a spinning reel wherein the coupling portion is formed in a shape that an inner peripheral part thereof is formed along the shape of the outer peripheral part of the master gear shaft. In this case, it is possible to form the entire size of the slider body in a small size, for example, by forming the coupling portion in an approximately U-shape along the outer peripheral part of the columnar shaped master gear shaft.

According to another aspect of the present invention, a spinning reel wherein the worm shaft is disposed to face the gear part. The engaging member is engaged with the spiral groove on a side getting away from the gear part of the worm shaft. A part of the engaging member to be engaged with the spiral groove on the side getting away from the gear part of the worm shaft is rotationally movably mounted to the slider body, and the slider body is disposed to be opposed only to the side getting away from the gear part of the outer periphery of the worm shaft.

In the spinning reel, the worm shaft is disposed to face the gear part of the master gear, and the slider body is disposed to be opposed only to the side getting away from the gear part of the outer periphery of the worm shaft. Here, the worm shaft is disposed to be opposed to the slider body. Therefore, compared to a conventional case that the worm shaft penetrates the slider body, it is possible to form the slider body in a smaller size. Furthermore, here, the gear part of the master gear, the worm shaft, the engaging member, and the slider body are also disposed in this order in the rightward or leftward direction. Therefore, it is possible to dispose the worm shaft to be adjacent to the gear part, which has been impossible in the conventional case that the worm shaft penetrates the slider body. Accordingly, it is possible to compactly form the reel unit in the horizontal direction.

According to another aspect of the present invention, a spinning reel wherein the reel unit includes a body member which has openings on both lateral sides thereof and in which elements making up the oscillation mechanism are accommodated, a first lid member covering the lateral opening formed on the gear part mounting side of the body member, and a second lid member covering the lateral opening formed on the opposite side from the gear part mounting side of the body member. The engaging member is inserted into the body member through the opening formed on the second lid member side of the reel unit. In this case, the reel unit is made up of three pieces, that is, the body member, the first lid member, and the second lid member. Therefore, it is possible to easily assemble the master gear through the opening of the first lid member and assemble the worm shaft, the slider body, and the engaging member through the opening of the second lid member.

According to another aspect of the present invention, a spinning reel wherein the engaging member includes an engaging portion that is engaged with the worm shaft, and a mounting shaft part that is mounted to the slider body from the second lid member mounting side. In this case, it is possible to sequentially assemble the slider body and the engaging member in this order from the second lid member mounting side. Therefore, it is possible to enhance an easy-assembling property.

According to another aspect of the present invention, it is possible to dispose the worm shaft to be adjacent to the gear part. Therefore, it is possible to compactly form the reel unit in the horizontal direction.

According to another aspect of the present invention, a spinning reel wherein the oscillation mechanism is provided in the reel unit and further includes a guide part for guiding the slider in the anteroposteior direction, and the worm shaft is disposed more adjacent to the gear part than the spool shaft, and the guide part includes a guide shaft that is disposed along the anteroposterior direction below the part of the slider body to which the engaging member is mounted so that at least a part of the guide part overlaps with the part of the slider body to which the engaging member is mounted. In this case, it is possible to efficiently use a dead space below the portion to which the engaging member is mounted, and thereby disposition of the guide shaft does not easily affect the horizontal width of the reel unit.

According to another aspect of the present invention, a spinning reel wherein the guide shaft is disposed lateral to the spool shaft on a side getting away from the master gear so that at least a part of the guide shaft overlaps with the spool shaft. In this case, the guide shaft is disposed on the outward of the spool shaft mounting portion of the slider. Therefore, arrangement of the guide shaft does not easily affect the vertical size of the reel body.

According to an aspect of the present invention, in the spinning reel, the first mounting portion and the second mounting portion are disposed to straddle above and below the master gear shaft when the spool shaft is positioned most forward. Therefore, it is possible to compactly form a reel unit in the anteroposterior direction.

According to another aspect of the present invention, in the spinning reel, the worm shaft is disposed to face the gear part of the master gear, and the slider body is disposed to be opposed only to the side getting away from the gear part of the outer periphery of the worm shaft. Therefore, it is possible to form the slider body in a small size, and it is also possible to compactly form the reel unit in the horizontal direction.

These and other features, aspects and advantages of the present invention will become apparent to those skilled in the art from the following detailed description, which, taken in conjunction with the annexed drawings, disclose example embodiments of the present invention.

BRIEF DESCRIPTION OF THE DRAWINGS

Referring now to the attached drawings which form a part of this original disclosure.

DETAILED DESCRIPTION OF THE EMBODIMENTS

Figure 1:
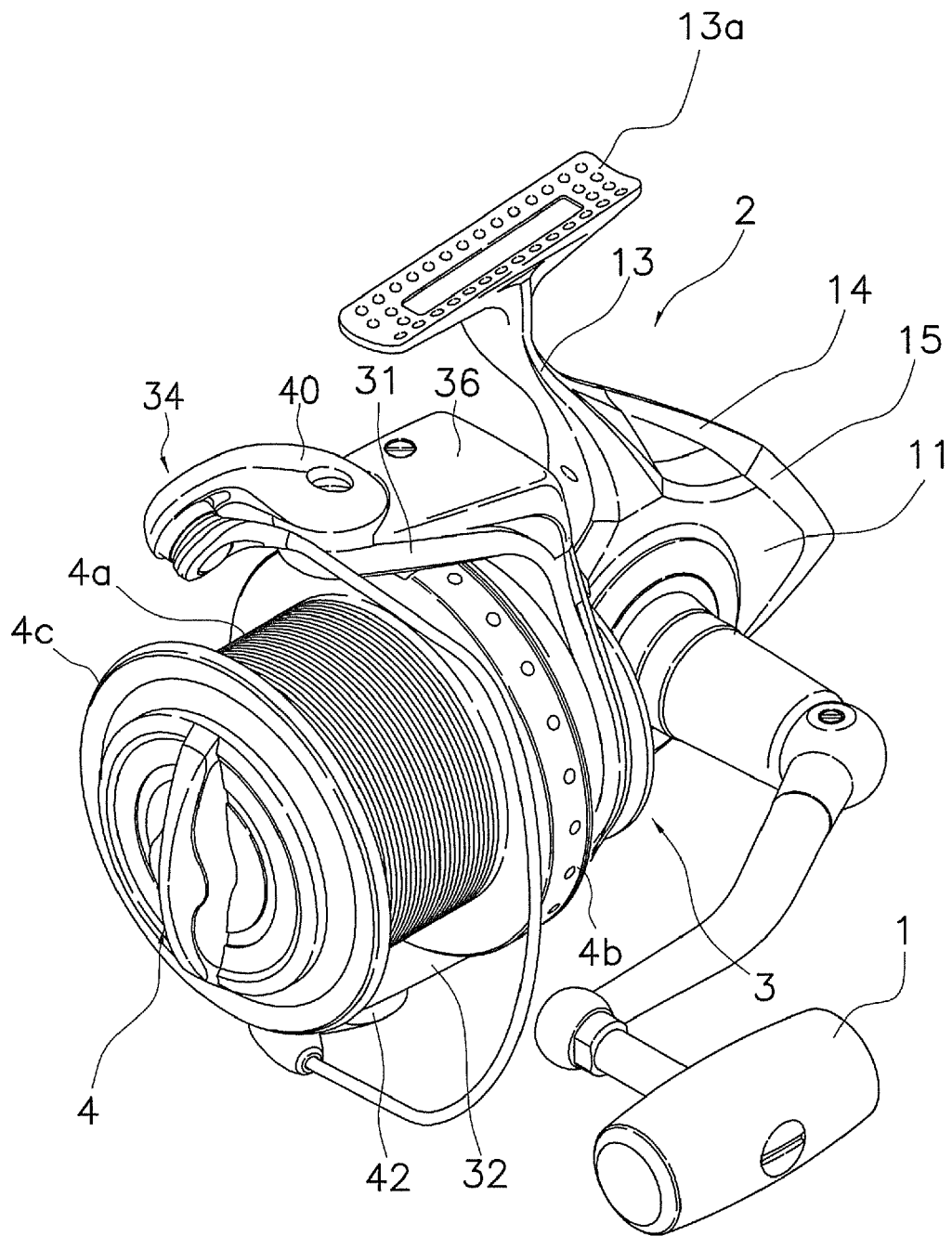
FIG. 1 is a lateral view of a spinning reel to which an embodiment of the present invention is applied.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

FIGS. 1-3 and 8 is a spinning reel for surf casting according to an embodiment of the present invention. As illustrated in FIGS. 1-3 and 8, the spinning reel generally includes a reel unit 2 with a handle 1, a rotor 3, and a spool 4. The reel unit 2 is mounted to a fishing rod. The rotor 3 is rotatably mounted to the front part of the reel unit 2, and the spool 4 is disposed on the front part of the rotor 3 and configured to move back and forth. The spinning reel also includes a rotor driving mechanism 5 for rotationally driving the rotor 3 in conjunction with rotation of the handle 1, and an oscillation mechanism 6 for moving the spool 4 back and forth in conjunction with rotation of the rotor 3.

The reel unit 2 is constructed to accommodate the rotor driving mechanism 5 and the oscillation mechanism 6 in an interior thereof. As illustrated in FIGS. 1-3 and 8, the reel unit 2 includes a chassis part 10, a first lid member 11 and a second lid member 12, a rod attachment leg portion 13, a first cover member 14 and a second cover 15. The chassis part 10 is opened on both sides of the reel unit. The first lid member 11 and the second lid member 12 cover the opened portions of the chassis part 10. The rod attachment leg portion 13 is formed integral with the chassis part 10. The first cover member 14 and the second cover 15 cover the chassis part 10, the first lid member 11, and the second lid member 12 from behind.

Figure 2:
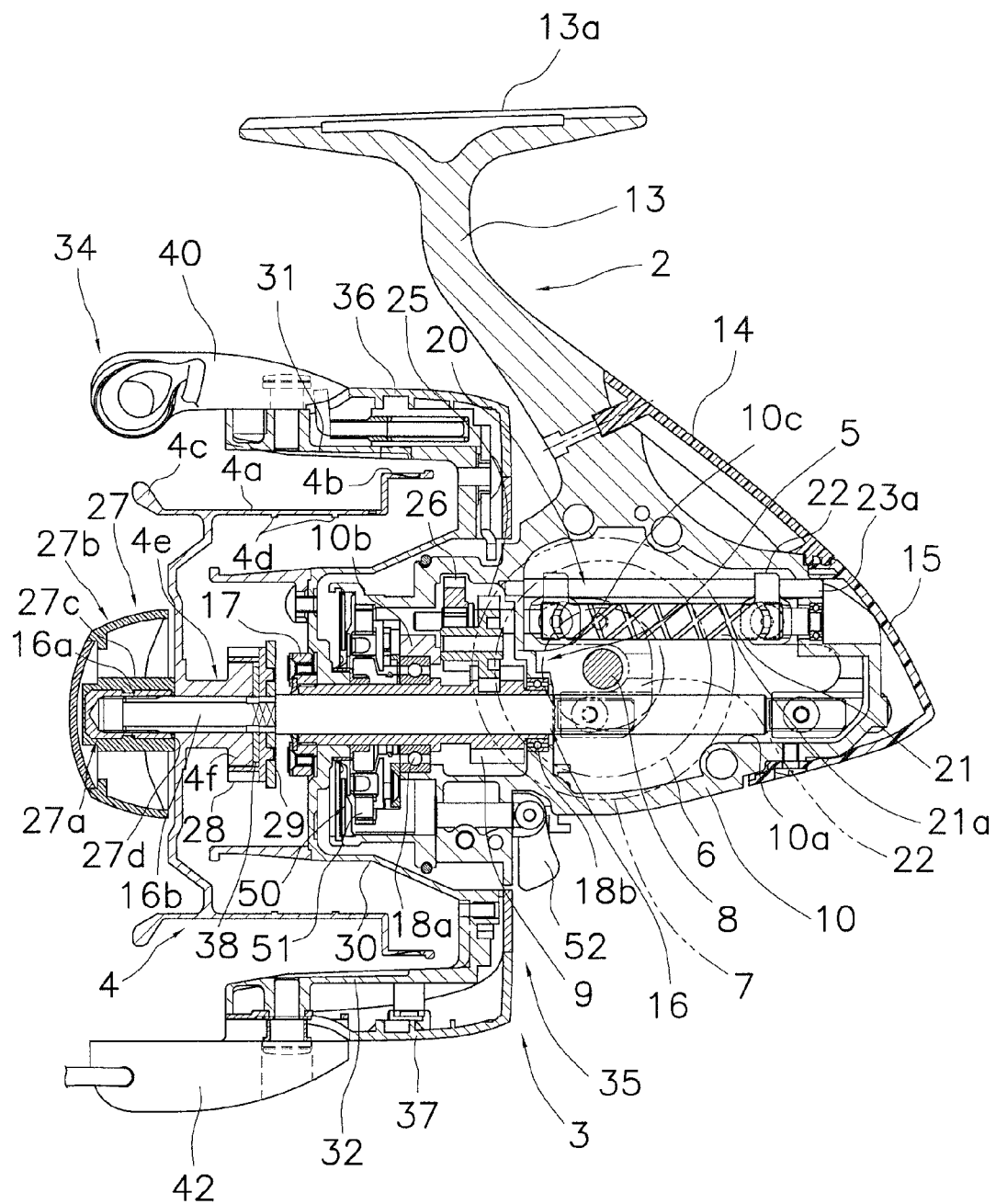
FIG. 2 is a lateral cross-sectional view of the spinning reel.
Figure 3:
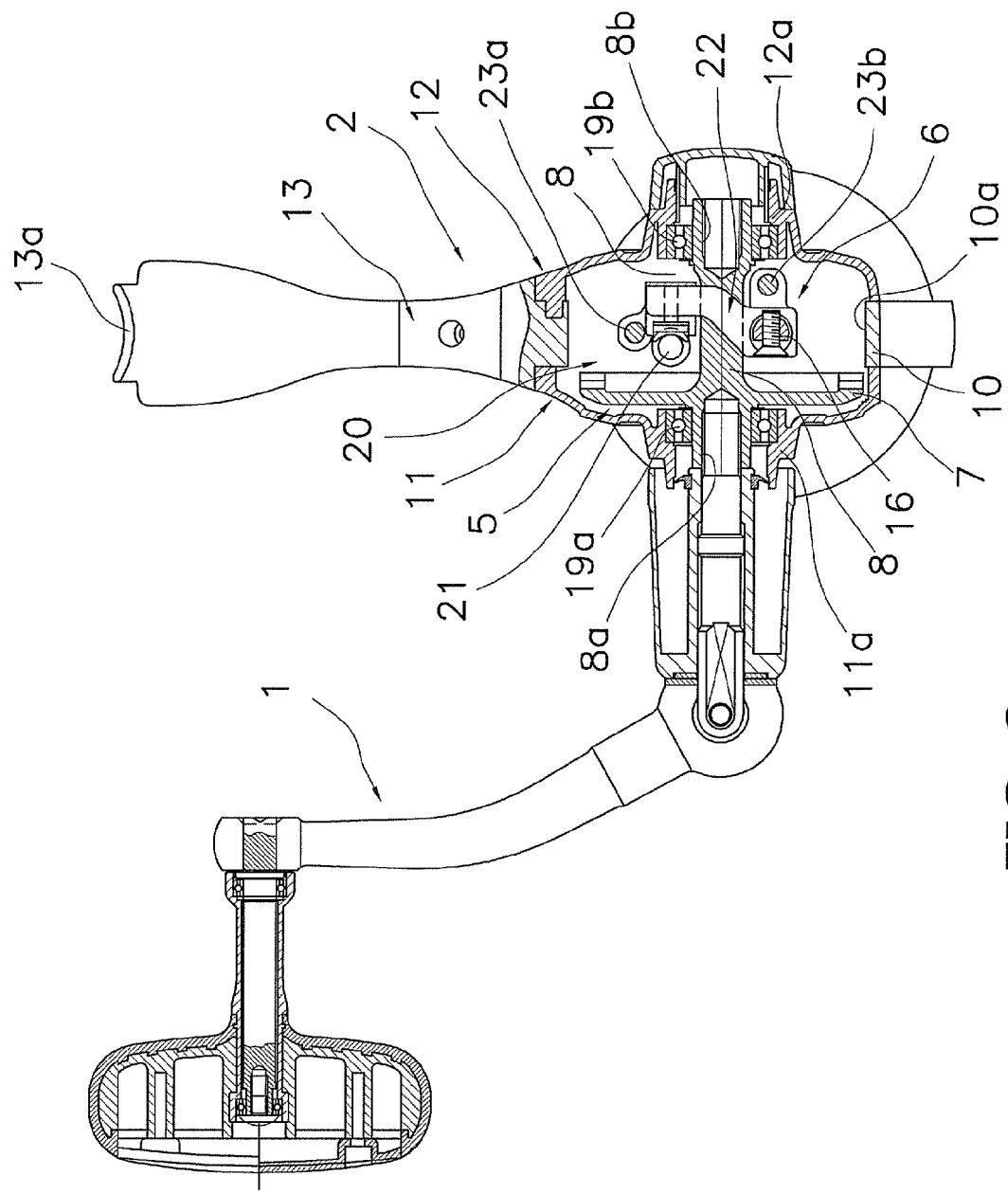
FIG. 3 is a rear cross-sectional view of the spinning reel.
Figure 8:
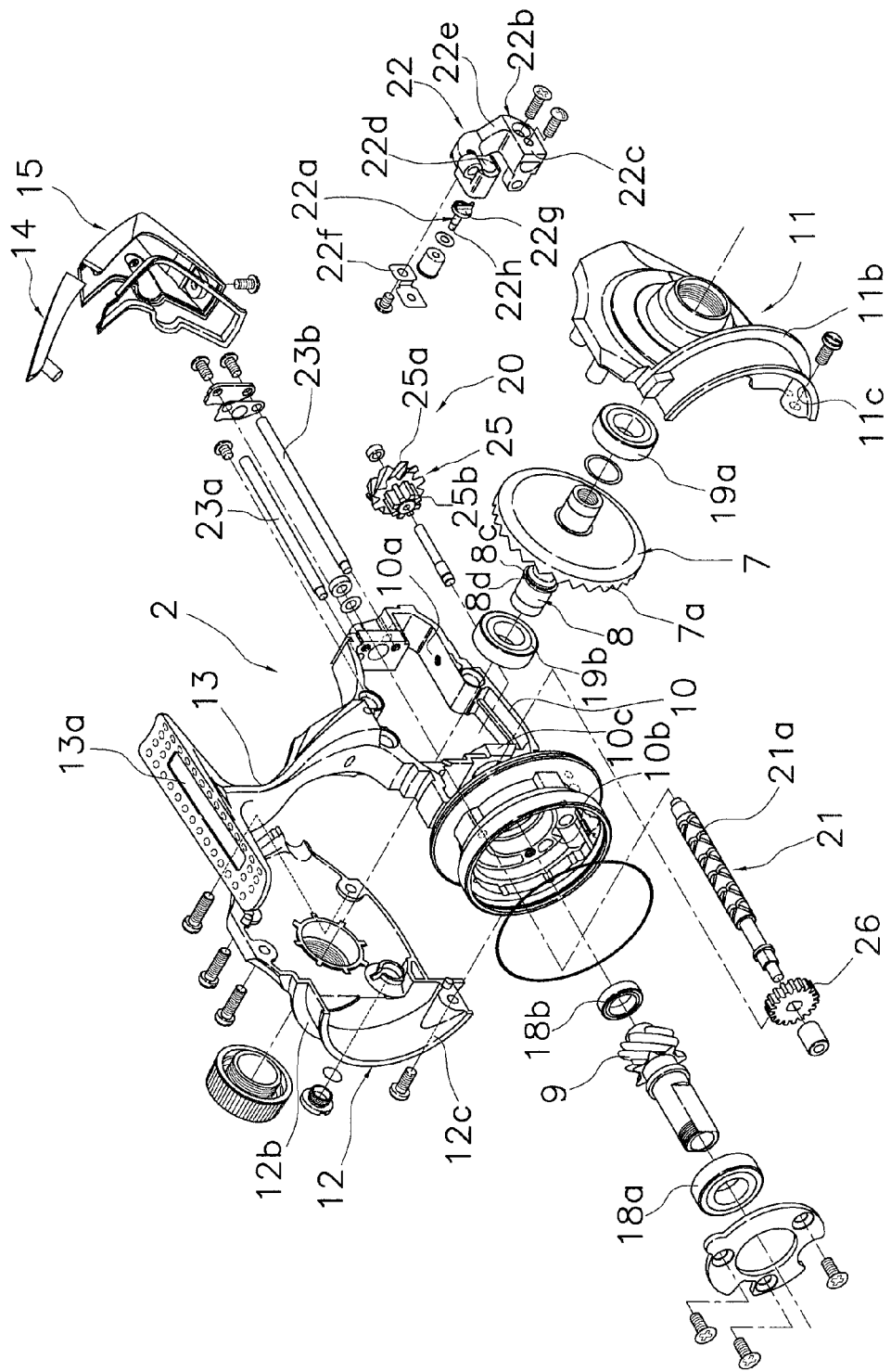
FIG. 8 is a perspective view of the spinning reel.

As illustrated in FIGS. 2, 3, and 8, the chassis part 10 is made, for example, of aluminum alloy. The chassis part 10 is a frame shaped member with openings on both of its surfaces. The openings in the frame shaped member form an interior space 10*a* for accommodating and supporting the rotor driving mechanism 5 and the oscillation mechanism 6. As illustrated in FIGS. 2 and 8, a disk shaped mechanism supporting portion 10*b* is formed on the front surface of the chassis part 10. Elements such as a one-way clutch 51 (to be described later) of an anti-reverse rotation mechanism 50 and a pinion gear 9 (also to be described later) are mounted to the disk shaped mechanism supporting portion 10b.

The first lid member 11 is made of, for example, aluminum alloy and is formed to cover one side of the chassis part 10. As described in FIGS. 3 and 8, the first lid member 11 is disposed adjacent to a master gear 7 of the rotor driving mechanism 5. Also, as illustrated in FIG. 3, a first boss portion 11a is formed approximately in the center part of a wall surface of the first lid member 11 so as to protrude outward. The first boss portion 11a is arranged to support an end of a master gear shaft 8 on the rear surface side of the master gear 7. Also, as illustrated in FIG. 8, a substantially semi-circular first flange portion 11b is formed in the front part of the first lid member 11. The first flange portion 11b includes a disk portion entering the interior of the rotor 3. Furthermore, as illustrated in FIG. 8, a substantially semi-circular arc shaped first mechanism accommodating cover 11c is formed in the front part of the first flange portion 11b. The first mechanism accommodating cover 11c is disposed on the rear surface of the mechanism supporting portion 10b and is substantially coplanar with the outer peripheral surface of the mechanism supporting portion 10b.

The second lid member 12 is made of, for example, aluminum alloy and is formed to have a substantially symmetrical mirrored shape of the first lid member 11. As illustrated in FIGS. 3 and 8, a second boss portion 12a, a second flange portion 12b, and a second mechanism accommodating cover 12c are formed in the second lid member 12, and are formed to have a substantially symmetrical mirrored shape of the first boss portion 11a, the first flange portion 11b, and the first mechanism accommodating cover 11c, respectively. Therefore, the first flange portion 11b and the second flange portion 12b together form a circular shape with the outer peripheral surface of the rear surface of the mechanism supporting portion 10b of the chassis part 10. The circular shaped portion is configured to fit into the rear surface of the rotor 3 through a slight gap. Note that the first lid member 11 and the second lid member 12 are fixed to the chassis part 10 by a single or a plurality of fixing members, e.g. round-head screws.

As illustrated in FIGS. 1-3 and 8, the rod attachment leg portion 13 is a T-shaped member extending upward from the chassis part 10, and a reel leg 13a is allowed to be mounted to a reel sheet (not illustrated in the figure) of a fishing rod. The reel leg 13a is formed on the tip of the rod attachment leg portion 13 so as to extend back and forth.

As illustrated in FIGS. 1-3 and 8, the first cover member 14 and the second cover member 15 have a curved shape for covering the lateral part and the bottom part of the chassis part 10 from behind in a state that the first lid member 11 and the second lid member 12 have been already mounted to the chassis part 10. The first cover member 14 and the second cover member 15 are made of relatively hard synthetic resin, for example an ABS resin, and metallic plating is performed with respect to its surface.

As illustrated in FIGS. 2, 3, and 8, the rotor driving mechanism 5 includes the master gear shaft 8, the master gear 7, and the pinion gear 9. A handle shaft 1a of the handle 1 is secured to the master gear shaft 8. The master gear 7 is formed integral with the master gear shaft 8, and the pinion gear 9 meshes with the master gear 7.

A As illustrated in FIG. 3, the master gear 7 is a face gear made of, for instance, aluminum alloy and is formed integral with the master gear shaft 8. As illustrated in the enlarged view of FIG. 5, the master gear 7 is disposed so that a gear part 7a comprising tilted teeth mesh with the pinion gear 9.

As illustrated in FIG. 3, the master gear shaft 8 is a solid-core member that is made of, for example, aluminum alloy and is formed integral with the master gear 7. The master gear shaft 8 is rotatably mounted to the reel unit 2 by bearings 19a and 19b. Here, the bearings 19a and 19b are respectively mounted to the first boss portion 11a and the second boss portion 12a. The first boss portion 11a and the second boss portion 12a are respectively formed in the first lid member 11 and the second lid member 12 of the reel unit 2. As illustrated in the enlarged view of FIG. 5, the center part of the master gear shaft 8 is formed to have a diameter less than that of both end portions thereof and has a structure that is easily straddled by a slider 22 (to be described later). A part of the master gear shaft 8, which is straddled by a first mounting portion 22c and a second mounting portion 22d of a slider body 22b (to be described later), is a solid-core member and is formed to have a diameter less than that of other parts thereof.

Also, the master gear shaft 8 is disposed on a fishing-rod mounting side (upper side) of the spool shaft 16. Female threaded potions 8a and 8b are formed on the inner peripheral part of the both ends of the master gear shaft 8. The female threaded portions 8a and 8b are configured to be tightly screwed when the handle 1 is rotated in the line-winding direction. Therefore, the female threaded portion 8a in the left side of FIG. 3 is a left-hand threaded screw and the female threaded portion 8b in the right side of FIG. 3 is a right-hand threaded screw. Also, as illustrated in FIG. 8, a brim portion 8c with a large diameter is formed on the axial inner side of a part of the master gear shaft 8 supported by the bearing 19b. The brim portion 8c is configured to make contact with an inner ring of the bearing 19b. Cut-out portions 8d are formed in two opposed positions on the outer peripheral surface of the brim portion 8c and are formed to be two-dimensionally cut out for easily inserting the master gear shaft 8 between the spool shaft 16 and a worm shaft 21 when assembled.

Note that the handle 1 is configured to be mounted to one end of the master gear shaft 8 in the left position (as illustrated in FIGS. 1 and 3) and the other end of the master gear shaft 8 in the right position (not illustrated in the Figures). However, the screwed directions of the female threaded portions 8a and 8b are different from each other. Therefore, when the handle shaft 1a is attached on either the right position or the left position of the master gear shaft 8, a threaded portion to be exclusively used for the right position and that for the left portion are prepared.

As illustrated in FIGS. 2 and 8, the pinion gear 9 is a hollow tubular shaped member, and its front part penetrates the rotor 3 and non-rotatably mounts the rotor 3 to the reel unit 2. As illustrated in FIG. 2, the spool shaft 16 penetrates the pinion gear 9 and is disposed in the inner peripheral part of the pinion gear 9. As illustrated in FIG. 2, a nut 17 is mounted to the front part of the pinion gear 9, and the rotor 3 is fixed to the pinion gear 9 by the nut 17. As illustrated in FIG. 2, the axially intermediate part and the axially rear end part of the pinion gear 9 are rotatably supported in the chassis part 10 of the reel unit 2 by means of bearings 18a and 18b, respectively. The bearings 18a and 18b are mounted to an intermediate mechanism supporting portion 10c.

As illustrated in FIGS. 2, and 3, the oscillation mechanism 6 is a traverse cam typed level-winding mechanism. The oscillation mechanism 6 includes a velocity reduction mechanism 20, a worm shaft 21, a slider 22, and two guide shafts 23a and 23b. The velocity reduction mechanism 20 meshes with the pinion gear 9. The worm shaft 21 is rotated in conjunction with the velocity reduction mechanism 20. The slider 22 is engaged with the worm shaft 21 and reciprocates back and forth. The two guide shafts 23a and 23b are arranged to guide the slider 22 in a direction of the spool shaft 16.

Figure 6:
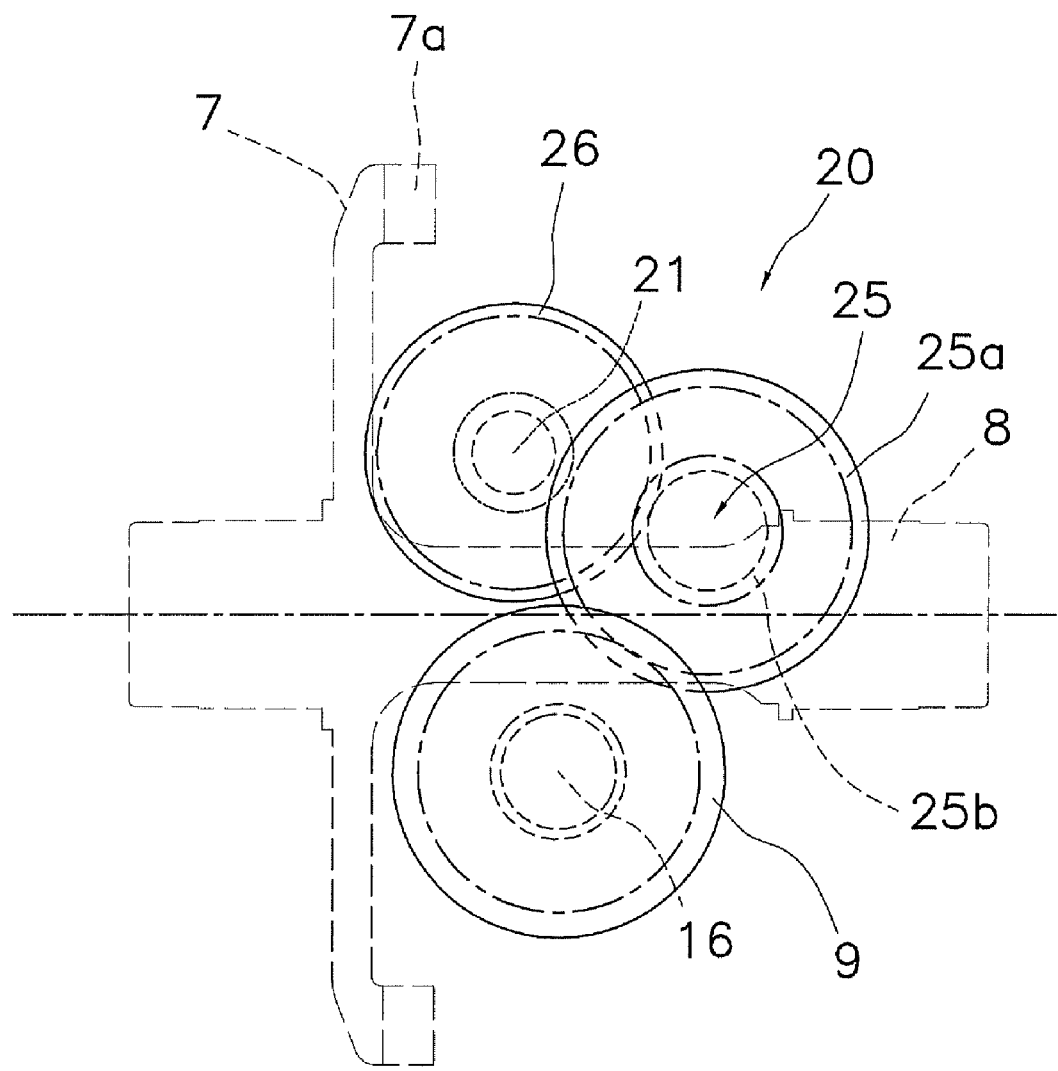
FIG. 6 is an enlarged rear view of a velocity reduction mechanism.
Figure 7:
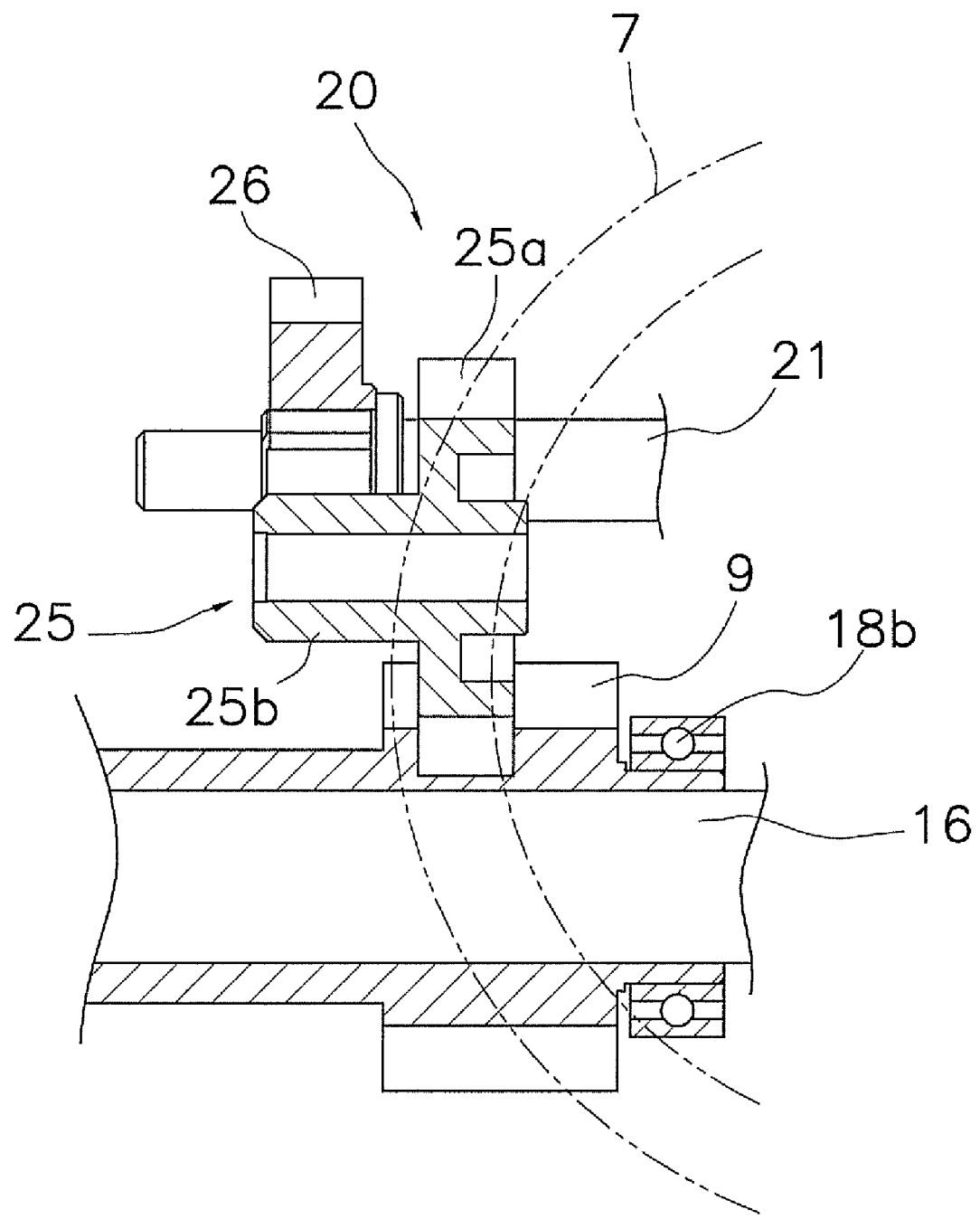
FIG. 7 is an enlarged lateral view of the velocity reduction mechanism.

As illustrated in enlarged views of FIGS. 6 and 7, the velocity reduction mechanism 20 includes a stepped gear 25 having a small-diameter gear 25b and a large-diameter gear 25a that meshes with the pinion gear 9, and an intermediate gear 26 that meshes with the small-diameter gear 25b and is mounted to the shaft portion of the front end part of the worm shaft 21 so as not to be allowed to relatively rotate therewith. The stepped gear 25 rotates around an axis parallel to the pinion gear 9. The large-diameter gear 25a is a screw gear that meshes with the pinion gear 9. The small-diameter gear 25b is a screw gear that meshes with the intermediate gear 26.

As illustrated in FIG. 7, the pinion gear 9 is disposed below the master gear shaft 8, and the stepped gear 25 and the intermediate gear 26 are disposed above the master gear shaft 8. The shaft portion of the front end portion of the worm shaft 21 is formed to have a diameter less than that of the other parts thereof. Therefore, as illustrated in FIG. 7, the large-diameter gear 25a and the shaft portion of the front end portion of the worm shaft 21 are configured not to interfere easily with each other. The intermediate gear 26 is a screw gear that is fixedly mounted to the front end part of the worm shaft 21 so as not to be allowed to relatively rotate therewith. Here, with a configuration that the small-diameter gear 25b meshes with the intermediate gear 26, the diameter of which is greater than that of the small-diameter gear 25b, revolution of the pinion gear 9 is transmitted to the worm shaft 21 while greatly reduced. With the velocity reduction mechanism 20, the anteroposterior velocity of the spool 4 is reduced. Accordingly, it is possible to wind densely the fishing line.

As illustrated in FIGS. 2 and 8, the worm shaft 21 is a member that has an intersecting spiral-shaped spiral groove 21a formed on its surface and is disposed in parallel to the spool shaft 16. The worm shaft 21 is rotatably mounted to the front and rear ends of the chassis part 10. The worm shaft 21 is mounted to the chassis part 10 from behind the chassis part 10. As illustrated in the enlarged view of FIG. 4, the worm shaft 21 is disposed substantially parallel to the spool shaft 16 and is disposed on the fishing rod mounting side (upper side) of the master gear shaft 8. As illustrated in the enlarged view of FIG. 5, the worm shaft 21 is disposed to face the gear part 7a of the master gear 7. As illustrated in the enlarged view of FIG. 5, the worm shaft 21 is disposed to be more adjacent to the gear part 7a (the left side in FIG. 5) than the spool shaft 16.

As illustrated in FIGS. 2, 3, and 8, the slider 22 includes an engaging member 22a arranged to engage the spiral groove 21a of the worm shaft 21, a slider body 22b to which the engaging member 22a is mounted and which moves back and forth in conjunction with rotation of the worm shaft 21, and two guide shafts 23a and 23b (an example of a guide part) for guiding the slider body 22b in the anteroposterior direction. With a configuration that the tip of the engaging member 22a is engaged with the spiral groove 21a, the slider 22 reciprocates in the spool shaft direction in accordance with rotation of the worm shaft 21, and accordingly reciprocates the spool shaft 16 in conjunction with rotation of the handle 1.

Figure 5:
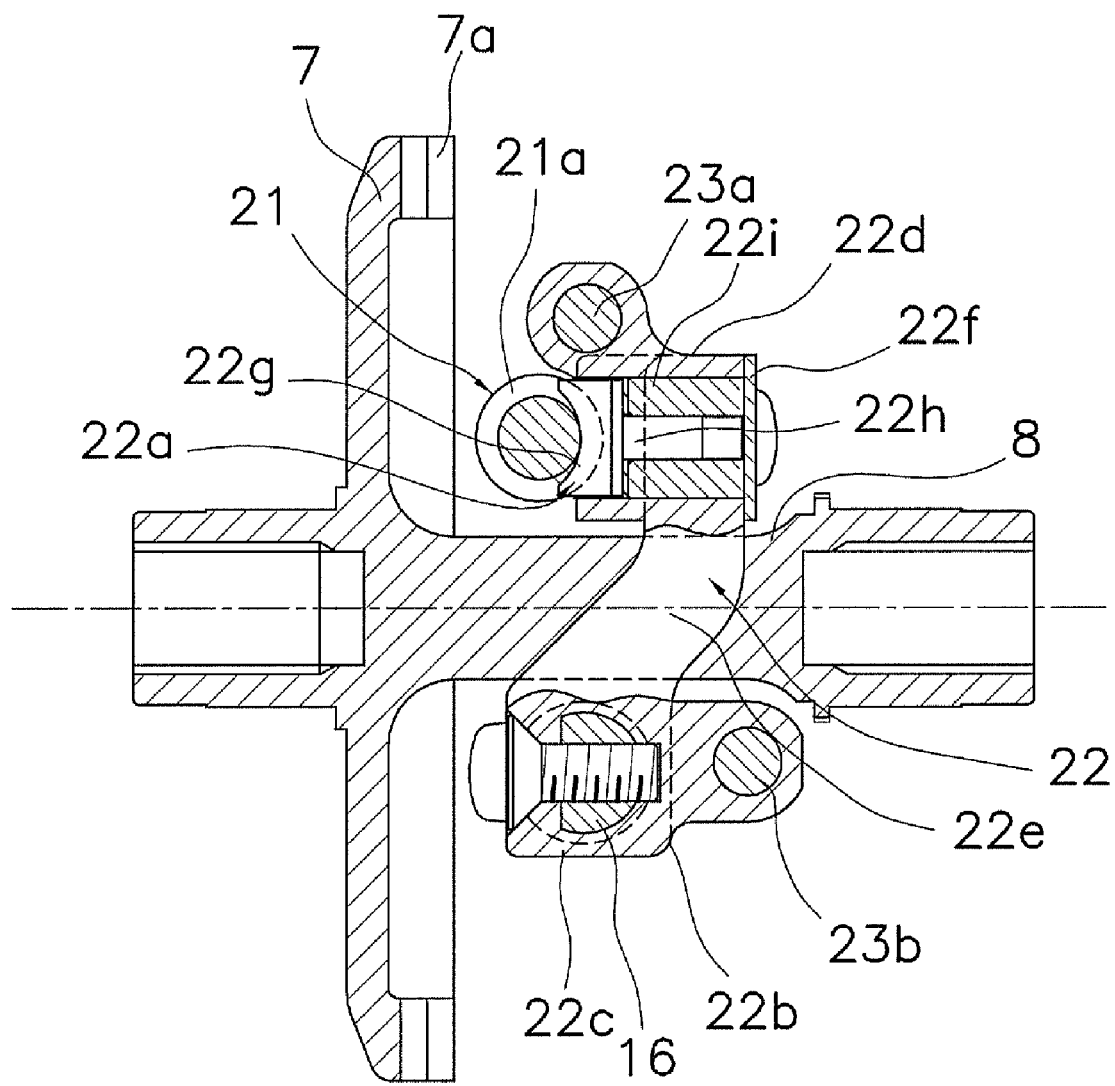
FIG. 5 is an enlarged rear view of the slider.

As illustrated in the enlarged view of FIG. 5, an engaging portion 22g on the front end side of the engaging member 22a is engaged with the spiral groove 21a of the worm shaft 21, and a mounting shaft portion 22h with a small diameter on the base end side of the engaging member 22a is rotationally movably supported by a bush 22i that is mounted to the slider body 22b. The base end portion of the engaging member 22a is retained by a plate member 22f. The engaging member 22a is inserted from an opening in the second lid member 12 of the reel unit 2. The engaging member 22a is assembled from the second lid member 12 mounting side in the order of the slider body 22b and the engaging member 22a.

Figure 4:
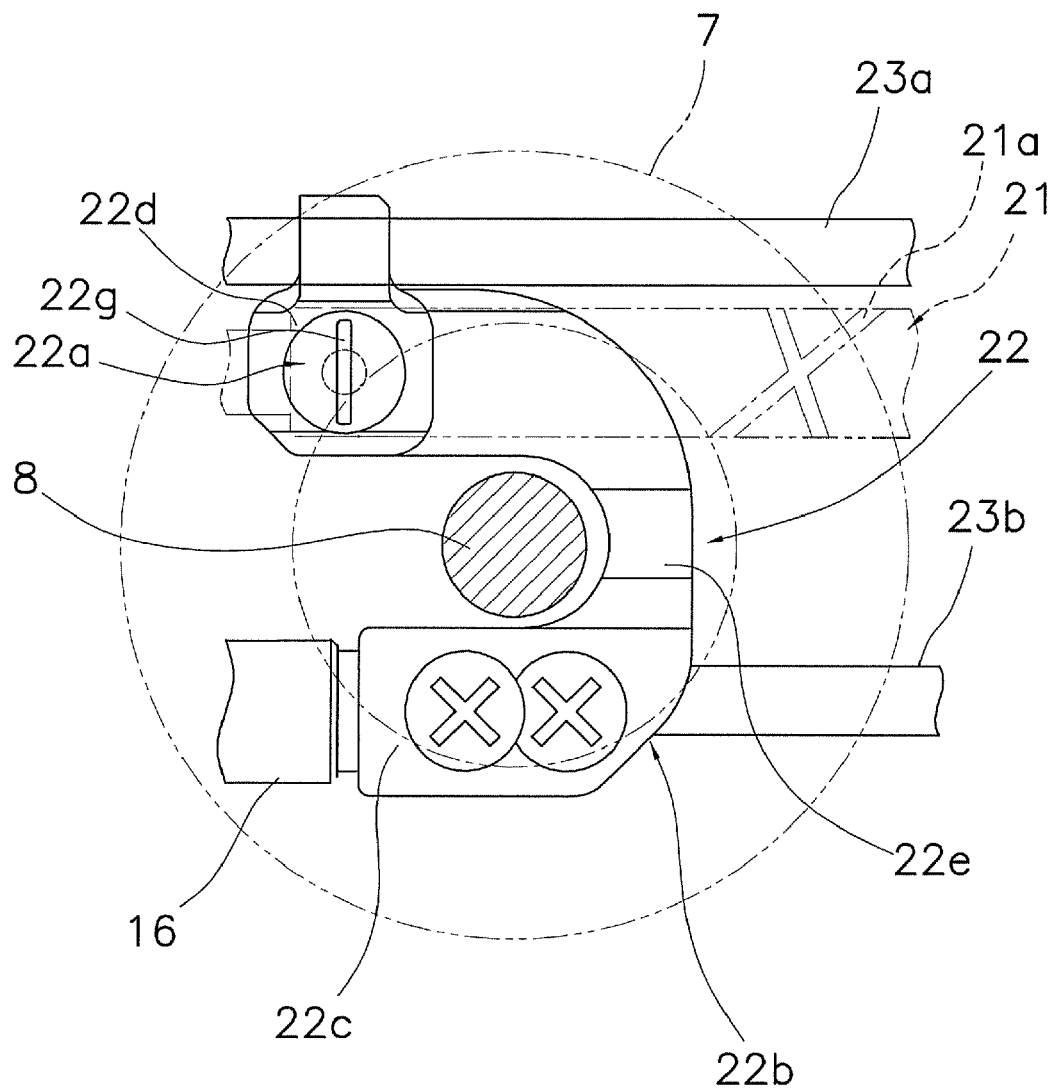
FIG. 4 is an enlarged lateral view of a slider.

As illustrated in the enlarged views of FIGS. 4 and 5, the slider body 22b includes the first mounting portion 22c to which the rear end portion of the spool shaft 16 is axially relatively non-rotatably mounted, the second mounting portion 22d to which the engaging member 22a is mounted, and a coupling portion 22e for coupling the first mounting portion 22c and the second mounting portion 22d so that the master gear shaft 8 is straddled by the first mounting portion 22c and the second mounting portion 22d when the spool shaft 16 is positioned most forward. In other words, the slider body 22b includes the first mounting portion 22c that is disposed on the opposite side from the fishing rod mounting side of the master gear shaft 8 (lower side of the master gear shaft 8) and functions as a portion to which the spool shaft 16 is fixed, the second mounting portion 22d that is disposed on the fishing rod mounting side of the master gear shaft 8 (upper side of the master gear shaft 8) and functions as a portion to which the engaging member 22a is mounted, and the coupling portion 22e for coupling the first mounting portion 22c and the second mounting portion 22d so that the master gear shaft 8 is straddled by the first mounting portion 22c and the second mounting portion 22d when the spool shaft 16 is positioned most forward, and the first mounting portion 22c and the second mounting portion 22d are disposed to straddle above and below the master gear shaft 8.

As illustrated in FIG. 4, the first mounting portion 22c and the second mounting portion 22d are disposed to be positioned anterior to the master gear shaft 8 when the spool shaft 16 is positioned most forward. As illustrated in FIG. 4, the second mounting portion 22d is disposed to be positioned anterior to the first mounting portion 22c. As illustrated in FIG. 5, the second mounting portion is disposed one-sided to the second lid member 12 (left side in FIG. 5) than the first mounting portion 22c. As illustrated in FIG. 4, the coupling portion 22e is formed in an approximately U-shape along the outer peripheral part of the columnar shaped master gear shaft 8 so that the inner peripheral part of the coupling portion 22e is formed in a shape along the outer peripheral part of the master gear shaft 8.

As illustrated in the enlarged view of FIG. 5, the slider body 22b is disposed to be opposed only to a side getting away from the gear part 7a (right side in FIG. 5) of the outer periphery of the worm shaft 21. Here, the worm shaft 21 is disposed to face the gear part of the master gear, and the slider body is disposed to be opposed only to the side getting away from the gear part 7a of the outer periphery of the worm shaft. Here, the worm shaft 21 is disposed to be opposed to the slider body 22b. Therefore, the gear part 7a of the master gear 7, the worm shaft 21, the engaging member 22a, and the slider body 22b are sequentially disposed in this order in the rightward direction in FIG. 5.

As illustrated in FIGS. 5 and 8, the guide shafts 23a and 23b penetrate the slider 22, and guide the slider 22 along the spool shaft 16. Both ends of the guide shafts 23a and 23b are fixed to the rear end of the chassis part 10 and the intermediate mechanism supporting portion 10c. The guide shafts 23a and 23b are fixed to the chassis part 10 from behind. The guide shaft 23a is disposed to be adjacent to the worm shaft 21 above the engaging portion 22g of the engaging member 22a in FIG. 5, that is, in a direction getting close to the reel leg 13a. Also, the guide shaft 23b is disposed along the anteroposterior direction below the mounting shaft portion 22h of the engaging member 22a, that is, in a direction getting away from the reel leg 13a, so that at least a part of the guide shaft 23b overlaps with the mounting shaft portion 22h.

Also, the guide shaft 23b is disposed lateral to the spool shaft 16 in a direction getting away from the master gear 7 so that at least a part of the guide shaft 23b overlaps with the spool shaft 16. With the arrangement of the guide shaft 23a disposed adjacent to the engaging portion 22g, it is possible to constantly keep distance between the engaging portion 22g and the spiral groove 21a without supporting the slider body 22b by the worm shaft 21, and accordingly an engaging state of the engaging member 22a is not easily changed. Also, with the arrangement of the guide shaft 23b disposed below the mounting shaft portion 22h of the engaging member 22a, it is possible to efficiently use a dead space below the mounting shaft portion 22h, and even when the guide shaft 23 is provided, this does not easily affect the width of the reel unit 2 in the horizontal direction. Furthermore, the guide shaft 23b does not easily affect the size of the reel unit 2 in the vertical direction because of the arrangement of the guide shaft 23b disposed lateral to the spool shaft 16.

As illustrated in FIG. 2, the rotor 3 includes a rotor body 35 that is rotatably mounted to the reel unit 2 through the pinion gear 9, and a bail arm 34 that is pivotably mounted to the rotor body 35. For example, the rotor body 35 is made of aluminum alloy, and includes a tubular support portion 30 that is fixed to the pinion gear 9, and first and second rotor arms 31 and 32 that extend forward from opposed positions on the outer peripheral surface of the rear end part of the support portion 30 so as to be separated from the support portion 30 at a predetermined interval, respectively. The support portion 30, the first rotor arm 31, and the second rotor arm 32, all of which make up the rotor body 35, are made up of aluminum alloy, for instance, and are integrally formed by the die-cast molding method. As illustrated in FIGS. 1 and 2, the radially outer peripheral side of the first rotor arm 31 and that of the second rotor arm 32 are covered with a first cover member 36 and a second cover member 37, respectively. Also, a first bail support member 40 and a second bail support member 42, which make up the bail arm 34, are pivotably mounted to the outer peripheral side of the tip of the first rotor arm 31 and that of the second rotor arm 32. The bail arm 34 is provided for winding the fishing line around spool 4 while the fishing line is smoothly guided from the fishing rod to the spool 4. The bail arm 34 is allowed to swing back and forth between a line-guiding posture and a line-releasing posture that flips from the line-guiding posture.

As illustrated in FIG. 2, the rotor 3 is allowed to block and release rotation in the line-releasing direction by means of the anti-reverse rotation mechanism 50. The anti-reverse rotation mechanism 50 includes the roller typed one-way clutch 51 that is mounted to the mechanism supporting portion 10b of the chassis part 10. The one-way clutch 51 is allowed to be switched between a reverse-rotation prohibited state and a reverse-rotation permitted state. The anti-reverse rotation mechanism 50 further includes a switching operating part 52 for switching the one-way clutch 51 between the reverse-rotation prohibited state and the reverse-rotation permitted state. The switching operating part 52 is pivotably supported in the bottom part of the mechanism supporting portion 10b of the chassis part 10.

As illustrated in FIG. 2, the spool 4 is made up of aluminum alloy and is formed in a shallow groove shape, and includes a bobbin trunk 4a that the fishing line is wound around the outer periphery thereof, a tubular skirt portion 4b that is formed on the rear end part of the bobbin trunk 4a so as to have a diameter greater than that of the bobbin trunk 4a, and a front flange portion 4c that is formed on the front end part of the bobbin trunk 4a so as to have a diameter slightly greater than that of the bobbin trunk 4a. The bobbin trunk 4a is formed in a thin-walled tubular shape, and a plurality of (e.g., two) annular ribs 4d for reinforcement are formed on its inner peripheral surface so as to be axially disposed at predetermined intervals.

Figure 9:
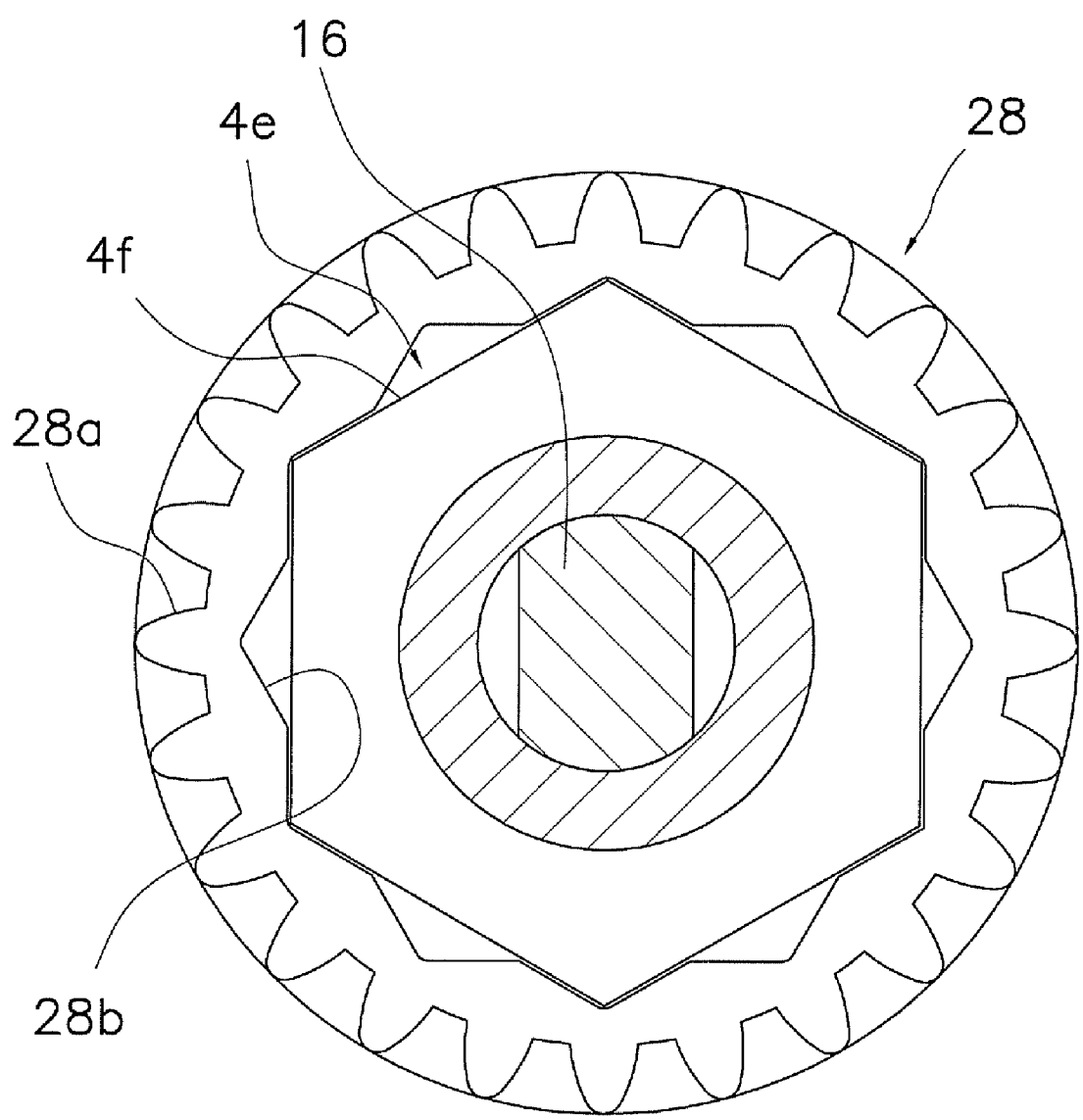
FIG. 9 is a cross-sectional view of a boss portion of a spool.

Also, the spool 4 includes an attachment boss 4e on its center, and the attachment boss 4e is allowed to be rotatably mounted to the spool shaft 16. A rear end portion 4f of the attachment boss 4e is formed to have a large diameter. In addition to this, as illustrated in FIG. 9, the outer peripheral surface of the rear end portion 4f is formed in a hexagonal shape. The large-diameter portion 4f is non-rotatably coupled to a gear member 28 that is mounted to the spool shaft 16 on its rearward. Normally, the gear member 28 is a member, on the outer peripheral surface of which a teeth portion 28a for producing a sound is formed for the purpose of producing a sound when the spool 4 with a drag mechanism relatively rotates with the spool shaft 16. However, such a drag sound-producing mechanism is not provided in the embodiment. In the embodiment, the gear member 28 is used for preventing the spool 4 from rotating with respect to the spool shaft 16. The gear member 28 is non-rotatably coupled to a metal washer member 29 that is non-rotatably mounted to the spool shaft 16 while its rearward movement is regulated. A star-shaped recessed portion 28b with 12 points, with which the hexagonal large-diameter portion 4f is non-rotatably engaged, is formed on the front surface of the gear member 28. Note that in a case of a spool with a drag mechanism, a sound is produced with the teeth portion 28a, and the spool 4 is configured to be allowed to rotate with respect to the spool shaft 16 without the recessed portion 28b.

Note that in the embodiment, the gear member 28 is non-rotatably coupled to the spool shaft 16. However, the gear member 28 may be allowed to relatively rotate with respect to the spool shaft 16 because the gear member 28 is prevented from rotating by the washer member 29.

For example, a retaining washer 38 is provided between the gear member 28 and the rear surface of the large-diameter portion 4f, and is made up of synthetic resin and serves to prevent the gear member 28 and the washer member 29 from coming off when the spool 4 is removed from the spool shaft 16. The retaining washer 38 is mounted to the spool shaft 16. The portion of the retaining washer 38 mounted to the spool shaft 16 is formed to have a diameter slightly less than that of the other portions, and thus the retaining washer 38 is configured not to easily come off the spool shaft 16.

The spool 4 is secured to the spool shaft 16 by a knob member 27 that is screwed onto the tip of the spool shaft 16. Not only a male threaded portion 16a but also chamfered portions 16b that are formed in parallel to each other and have a length greater than that of the male threaded portion 16a are formed on the tip of the spool shaft 16. The knob member 27 includes a nut member 27a that is made up of metal and is screwed onto the male threaded portion 16a of the spool shaft 16, and a knob body 27b that is made up of synthetic resin and is integrally formed with the nut member 27a by inserting the nut member 27a into a die. The knob body 27b includes a boss portion 27c in the interior of which the nut member 27a is disposed. The boss portion 27c is formed to reach a rear end surface 27d of the nut member 27a. Accordingly, it is possible to increase a contact surface between the nut member 27a and the boss portion 27c, and the nut member 27a is not easily loosened with respect to the boss portion 27c.

In the spinning reel, the worm shaft 21 is disposed on the fishing rod mounting side of the master gear shaft 8 (upper side of the master gear shaft 8), and the spool shaft 16 is disposed on the opposite side from the fishing rod mounting side of the master gear shaft 8 (lower side of the master gear shaft 9), and the engaging member 22a that meshes with the spiral grove 21a of the worm shaft 21 is also disposed on the fishing rod mounting side (upper side) of the master gear shaft 8. Also, the slider body 22b includes the first mounting portion 22c that is disposed on the opposite side from the fishing rod mounting side of the master gear shaft 8 (lower side of the master gear shaft 8) and functions as a portion for fixing the spool shaft 16, the second mounting portion 22d that is disposed on the fishing rod mounting side of the master gear shaft 8 (upper side of the master gear shaft 8) and functions as a portion for mounting the engaging member 22a, and the coupling portion 22e for coupling the first mounting portion 22c and the second mounting portion 22d so that the master gear shaft 8 is straddled by the first mounting portion 22c and the second mounting portion 22d when the spool shaft 16 is positioned most forward. Here, when the spool shaft 16 is positioned most forward, the first mounting portion 22c and the second mounting portion 22d are disposed to straddle above and below the master gear shaft 8. Therefore, it is possible to dispose the first mounting portion 22c, which functions as a portion for fixing the spool shaft 16, and the second mounting portion 22d, which functions as a portion for mounting the engaging member 22a, on the front side of the master gear shaft 8. Therefore, it is possible to sufficiently keep the anteroposterior displacement of the slider 22 without extending rearward the guide shafts 23a and 23b for guiding the worm shaft 21 and the slider body 22b in the anteroposterior direction. Therefore, it is possible to shorten the rear portion of the reel unit 2 in the anteroposterior direction. Accordingly, it is possible to compactly form the reel unit 2 in the anteroposterior direction.

Furthermore, in the spinning reel, the worm shaft 21 is disposed to face the gear part 7a of the master gear 7, and the slider body 22b is disposed to be opposed only to the side getting away from the gear part 7a (right side in FIG. 5) of the outer periphery of the worm shaft 21. Here, the worm shaft 21 is disposed to be opposed to the slider body 22b. Therefore, compared to a conventional case in which a worm shaft penetrates a slider body, it is possible to form the slider body 22b in a smaller size. Furthermore, in this case, the gear part 7a of the master gear 7, the worm shaft 21, the engaging member 22a, and the slider body 22b are also disposed in this order in the leftward direction. Therefore, it is possible to dispose the worm shaft 21 to be adjacent to the gear part 7a, which has been impossible in the conventional case that the worm shaft penetrates the slider body. Accordingly, it is possible to compactly form the reel unit 2 in the horizontal direction.

OTHER EXAMPLE EMBODIMENTS (a) In the above described embodiment, a spinning reel for surf casting has been exemplified. However, a spinning reel of another aspect may be produced, which includes the oscillation mechanism 6 of the above described embodiment.

(b) In the above described embodiment, the master gear 7 and the master gear shaft 8 are integrally molded with aluminum alloy, but may be integrally molded with stainless alloy. Also, the master gear 7 and the master gear shaft 8 may be separately formed and the master gear 7 may be configured to be fixed to the master gear shaft 8 with a screw. For example, the master gear 7 may be formed with aluminum alloy, and the master gear shaft 8 may be formed with stainless alloy. Also, the shaft portion of the master gear shaft 8 is formed to have a small diameter while the strength of the master gear 7 is highly maintained by integrally molding the master gear 7 and the part of the master gear shaft 8 that is supported by the bearing 19a with stainless alloy and by integrally molding a section of the master gear shaft 8 ranging from its shaft portion to the part supported by the bearing 19b with aluminum alloy. Accordingly, it is possible to reduce the entire weight.

(c) In the above described embodiment, the master gear shaft 8 is a solid-core member. However, the master gear shaft 8 may be a hollow tubular shaped member, and may be configured to be reduced in weight by forming a plurality of through holes therein.

(d) In the above described embodiment, the worm shaft 21 is configured that the gear part 7a of the master gear 7, the worm shaft 21, the engaging member 22a, and the slider body 22b are sequentially disposed in this order in the rightward direction in FIG. 5. However, in a case of a reel in which the rotor 3 rotates in the reverse direction, the gear part 7a of the master gear 7, the worm shaft 21, the engaging member 22a, the slider body 22b may be configured to be sequentially disposed in this order in the leftward direction.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel configured to be mounted to a fishing rod and to reel out a fishing line forward, comprising:
   a reel unit configured to be mounted to the fishing rod, the reel unit including a handle;
   a spool shaft mounted to the reel unit and arranged to move along an anteroposterior direction;
   a spool fixedly coupled to a front end portion of the spool shaft and the fishing line being wound around the outer periphery of the spool;
   a rotor rotatably disposed on the outer periphery of the spool, the rotor being adapted to wind the fishing line around the spool;
   a master gear rotatably supported by the reel unit, the master gear including a master gear shaft and a gear part, the handle being integrally and rotatably mounted to the master gear shaft, the master gear being disposed on the fishing rod mounting side of the spool shaft, the gear part being disposed on the outer peripheral side of the master gear shaft, the gear part being configured to transmit rotation of the handle to the rotor;

a pinion gear disposed on the outer peripheral side of the spool shaft, the pinion gear being integrally and rotatably mounted to the rotor, the pinion gear to which rotation of the master gear is transmitted in conjunction with rotation of the handle; and an oscillation mechanism configured to move the spool back and forth along the spool shaft in conjunction with rotation of the pinion gear, the oscillation mechanism including a worm shaft having a spiral groove on the outer peripheral part thereof, the worm shaft being disposed on the fishing rod mounting side of the master gear shaft substantially parallel to the spool shaft, the worm shaft being configured to rotate in conjunction with rotation of the pinion gear, and a slider having an engaging member and a slider body, the engaging member being engaged with the spiral groove of the worm shaft, the engaging member being mounted on the slider body, the slider body being configured to move back and forth in conjunction with rotation of the worm shaft, the slider body including a first mounting portion to which a rear end of the spool shaft is at least relatively non-rotatably mounted in an axial direction, a second mounting portion to which the engaging member is mounted, and a coupling portion arranged to couple the first mounting portion and the second mounting portion so that the master gear shaft is straddled by the first mounting portion and the second mounting portion when the spool shaft is positioned most forward, the first and second mounting portions being positioned anterior to the master gear shaft when the spool shaft is positioned most forward.

2. The spinning reel of claim 1, wherein the portion of the master gear shaft straddled by the first mounting portion and the second mounting portion is formed to have a diameter less than that of the other portions of the master gear shaft.

3. The spinning reel of claim 2, wherein the portion of the master gear shaft straddled by the first mounting portion and the second mounting portion is a solid-core member.

4. The spinning reel of claim 1, wherein the coupling portion is formed in a shape that an inner peripheral part thereof is formed along the shape of the outer peripheral part of the master gear shaft.

5. The spinning reel of claim 1, wherein the worm shaft is arranged to face the gear part, wherein the engaging member is arranged to engage the spiral groove on a side of the worm shaft opposite the gear part, and wherein a part of the engaging member to be engaged with the spiral groove on the side of the worm shaft opposite the gear part is rotationally movably mounted to the slider body, and the slider body is disposed to be opposed only on the side of the worm shaft opposite the gear part.

6. The spinning reel of claim 5, wherein the reel unit includes a body member, a first lid member, and a second lid member, the body member having openings on both lateral sides thereof, the body member in which elements making up the oscillation mechanism are accommodated, the first lid member covering the lateral opening formed on the gear part mounting side of the body member, the second lid member covering the lateral opening formed on the opposite side from the gear part mounting side of the body member, and wherein the engaging member is inserted into the body member through the opening formed on the second lid member side of the reel unit.

7. The spinning reel of claim 6, wherein the engaging member includes an engaging portion and a mounting shaft portion, the engaging portion being engaged with the worm shaft, the mounting shaft portion being mounted to the slider body from the second lid member mounting side.

8. The spinning reel of claim 7, wherein the worm shaft is disposed to be more adjacent to the gear part than the spool shaft.

9. The spinning reel of claim 8, wherein the oscillation mechanism is disposed in the reel unit and further includes a guide part for guiding the slider in an anteroposterior direction, and wherein the guide part includes a guide shaft, the guide shaft being disposed along the anteroposterior direction below the part of the slider body to which the engaging member is mounted so that at least a part of the guide shaft overlaps with the part of the slider body to which the engaging member is mounted in a direction perpendicular to the axes of the master gear and the spool shaft.

10. The spinning reel of claim 9, wherein the guide shaft is disposed lateral to the spool shaft on a side of the spool shaft opposite the master gear so that at least a part of the guide shaft overlaps with the spool shaft in a direction parallel to the axis of the master gear.

11. A spinning reel configured to be mounted to a fishing rod and to reel out a fishing line forward, comprising:

a reel unit configured to be mounted to the fishing rod, the reel unit including a handle;

a spool shaft mounted to the reel unit and arranged to move alone an anteroposterior direction;

a spool fixedly coupled to a front end portion of the spool shaft and the fishing line being wound around the outer periphery of the spool;

a rotor rotatably disposed on the outer periphery of the spool, the rotor being adapted to wind the fishing line around the spool;

a master gear rotatably supported by the reel unit, the master gear including a master gear shaft and a gear part, the handle being integrally and rotatably mounted to the master gear shaft, the master gear being disposed on the fishing rod mounting side of the spool shaft, the gear part being disposed on the outer peripheral side of the master gear shaft, the gear part being configured to transmit rotation of the handle to the rotor;

a pinion gear disposed on the outer peripheral side of the spool shaft, the pinion gear being integrally and rotatably mounted to the rotor, the pinion gear to which rotation of the master gear is transmitted in conjunction with rotation of the handle; and an oscillation mechanism configured to move the spool back and forth along the spool shaft in conjunction with rotation of the pinion gear, the oscillation mechanism including a worm shaft having a spiral groove on the outer peripheral part thereof, the worm shaft being disposed on the fishing rod mounting side of the master gear shaft substantially parallel to the spool shaft, the worm shaft being configured to rotate in conjunction with rotation of the pinion gear, and a slider having an engaging member and a slider body, the engaging member being engaged with the spiral groove of the worm shaft, the engaging member being mounted on the slider body, the slider body being configured to move back and forth in conjunction with rotation of the worm shaft, the slider body including a first mounting portion to which a rear end of the spool shaft is at least relatively non-rotatably mounted in an axial direction, a second mounting portion to which the engaging member is mounted, and a coupling portion arranged to couple the first mounting portion and the second mounting portion so that the master gear shaft is straddled by the first mounting portion and the second mounting portion when the spool shaft is positioned most forward, the entire second mounting portion being positioned on a side of the worm shaft opposite the gear part of the master gear.

12. A spinning reel configured to be mounted to a fishing rod and to reel out a fishing line forward, comprising:

a reel unit configured to be mounted to the fishing rod, the reel unit including a handle;

a spool shaft mounted to the reel unit and arranged to move along an anteroposterior direction;

a spool fixedly coupled to a front end portion of the spool shaft and the fishing line being wound around the outer periphery of the spool;

a rotor rotatably disposed on the outer periphery of the spool, the rotor being adapted to wind the fishing line around the spool;

a master gear rotatably supported by the reel unit, the master gear including a master gear shaft and a gear part, the handle being integrally and rotatably mounted to the master gear shaft, the master gear being disposed on the fishing rod mounting side of the spool shaft, the gear part being disposed on the outer peripheral side of the master gear shaft, the gear part being configured to transmit rotation of the handle to the rotor;

a pinion gear disposed on the outer peripheral side of the spool shaft, the pinion gear being integrally and rotatably mounted to the rotor, the pinion gear to which rotation of the master gear is transmitted in conjunction with rotation of the handle;

an oscillation mechanism configured to move the spool back and forth along the spool shaft in conjunction with rotation of the pinion gear, the oscillation mechanism including a worm shaft having a spiral groove on the outer peripheral part thereof, the worm shaft being disposed on the fishing rod mounting side of the master gear shaft substantially parallel to the spool shaft, the worm shaft being configured to rotate in conjunction with rotation of the pinion gear, and a slider having an engaging member and a slider body, the engaging member being engaged with the spiral groove of the worm shaft, the engaging member being mounted on the slider body, the slider body being configured to move back and forth in conjunction with rotation of the worm shaft, the slider body including a first mounting portion to which a rear end of the spool shaft is at least relatively non-rotatably mounted in an axial direction, a second mounting portion to which the engaging member is mounted, and a coupling portion arranged to couple the first mounting portion and the second mounting portion so that the master gear shaft is straddled by the first mounting portion and the second mounting portion when the spool shaft is positioned most forward;

first and second guide shafts penetrating the slider, the first guide shaft being disposed above the engaging member, and the second guide shaft being disposed lateral to the spool shaft.

13. The spinning reel of claim 12, wherein the second guide shaft is disposed on a side of the spool shaft opposite the master gear.

* * * * *